No. 707,719. Patented Aug. 26, 1902.
O. W. PLANT.
CUTTER FOR GEAR TEETH.
(Application filed Mar. 15, 1902.)
(No Model.)

Witnesses
A. S. Pieczentkowski
A. L. Makepeace.

Inventor.
Oliver W. Plant.
By Arnold J. Barlow.
Attorneys

UNITED STATES PATENT OFFICE.

OLIVER W. PLANT, OF PROVIDENCE, RHODE ISLAND.

CUTTER FOR GEAR-TEETH.

SPECIFICATION forming part of Letters Patent No. 707,719, dated August 26, 1902.

Application filed March 15, 1902. Serial No. 98,386. (No model.)

*To all whom it may concern:*

Be it known that I, OLIVER W. PLANT, a resident of the city of Providence, in the county of Providence and State of Rhode Island, have invented certain new and useful Improvements in Cutters for Gear-Teeth; and I do hereby declare that the following is a full, clear, and exact description thereof, reference being had to the accompanying drawings, and to the letters of reference marked thereon, which form a part of this specification.

This invention relates to rotary cutters for cutting the teeth of gear-wheels and the like, and is especially designed for cutting tapering teeth, such as are used in beveled gears.

The object of my invention is to provide an improved form of cutter in which the teeth of each member are so arranged as to prevent the cuttings from entering between the opposing faces of the two members, and thereby interfering with their relative adjustments.

Figure 1:
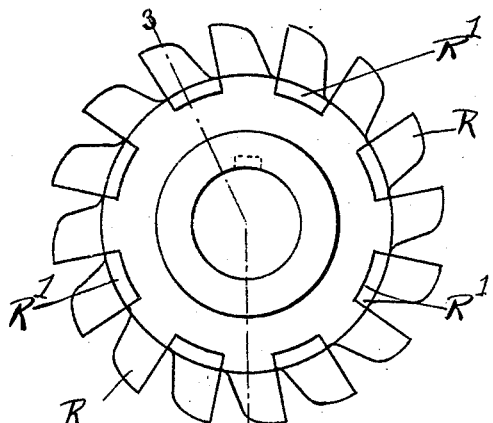
Figure 2:
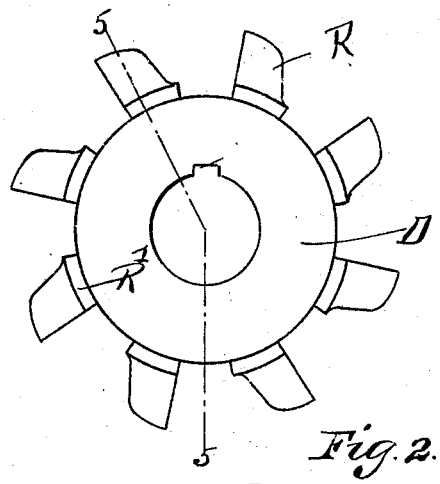
Figure 3:
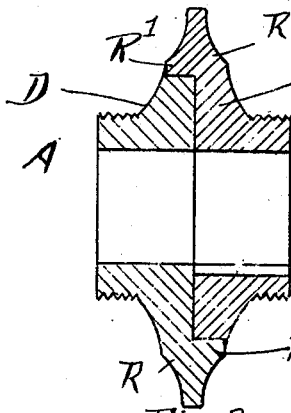
Figure 4:
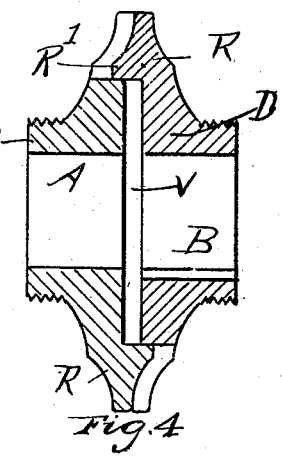
Figure 5:
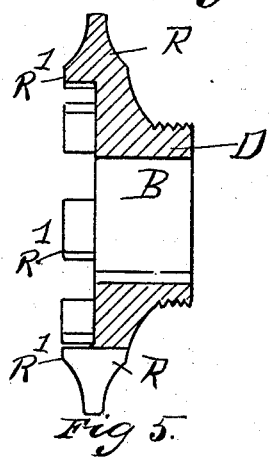

In the accompanying drawings, representing a cutter embodying my invention, Figure 1 is a side elevation of the cutter. Fig. 2 is an inner side view of one of the members of the cutter. Fig. 3 is a section on the line 3 3 of Fig. 1. Fig. 4 is a section of the cutter corresponding to Fig. 3, but with the members slightly separated. Fig. 5 is a section on the line 5 5 of Fig. 2.

Referring to the drawings, the cutter comprises two similar members A and B. Each member has a sleeve portion D, from which extend radial teeth R, that have spaces between them equal to the width of the teeth, as best shown in Fig. 2. It will be observed that each tooth has an extension R', extending laterally, which extensions are so disposed that the diametrical distance between them is equal to the circumference of the sleeve D.

When the two members of the cutter are brought together, as indicated in Fig. 4, each tooth of one member is passed between adjacent teeth of the other member, as indicated in Fig. 1; but it will be also seen that the inner face of the extension R' of each tooth will engage the periphery of the sleeve D in the other member. Consequently, when the members are drawn apart axially, each tooth extension will serve to cover the periphery of the disk-shaped space V, between the opposing faces of the sleeve D, and thereby prevent cuttings and particles from entering between the members A and B, which would interfere with their relative axial movement.

Having thus described my invention, what I claim is—

1. A cutter of the class described, consisting of two members; each member comprising a sleeve having spaced teeth arranged to occupy the spaces respectively between the teeth of the other member; and means connected with the teeth arranged to peripherally inclose the space between the opposing faces of the sleeves in different relative axial positions of the members.

2. A cutter of the class described, consisting of two members; each member comprising a sleeve with radial spaced teeth on its periphery that have lateral extensions, which extensions occupy the spaces respectively between the teeth of the other member; each said tooth being arranged to have the inner face of its said extension in engagement with the periphery of the sleeve of the other member in different relative axial positions of the members.

In testimony whereof I have hereunto set my hand this 14th day of March, A. D. 1902.

OLIVER W. PLANT.

In presence of—
HOWARD E. BARLOW,
BENJ. ARNOLD.